United States Patent
Buehler et al.

(10) Patent No.: US 8,797,431 B2
(45) Date of Patent: Aug. 5, 2014

(54) METHOD OF CONTROLLING THE RESOLUTION OF A HYPERSPECTRAL IMAGE

(75) Inventors: Eric Daniel Buehler, Grand Rapids, MI (US); Stefano Angelo Mario Lassini, Lowell, MI (US); Benjamin Thomas Occhipinti, Grand Rapids, MI (US)

(73) Assignee: General Electric Company, Schenectady, NY (US)

( * ) Notice: Subject to any disclaimer, the term of this patent is extended or adjusted under 35 U.S.C. 154(b) by 23 days.

(21) Appl. No.: 13/598,029

(22) Filed: Aug. 29, 2012

(65) Prior Publication Data

US 2014/0063298 A1 Mar. 6, 2014

(51) Int. Cl.
*H04N 5/335* (2011.01)

(52) U.S. Cl.
USPC .................. 348/273; 348/294; 348/222.1

(58) Field of Classification Search
CPC ....... H04N 9/045; H04N 5/335; H04N 5/272; H04N 3/1587
USPC .......... 348/272, 294, 239, 219.1, 222.1, 144, 348/145, 117
See application file for complete search history.

(56) References Cited

U.S. PATENT DOCUMENTS

| | | | |
|---|---|---|---|
| 7,369,229 B2 | 5/2008 | Bissett, III et al. | |
| 7,979,209 B2 | 7/2011 | O'Hara et al. | |
| 2002/0135760 A1* | 9/2002 | Poole | 356/300 |
| 2004/0061902 A1* | 4/2004 | Tang et al. | 358/3.01 |
| 2004/0071363 A1* | 4/2004 | Kouri et al. | 382/276 |
| 2006/0188147 A1 | 8/2006 | Rai et al. | |
| 2010/0177253 A1* | 7/2010 | Golub | 349/8 |
| 2011/0310236 A1* | 12/2011 | Rowe et al. | 348/77 |
| 2013/0208944 A1* | 8/2013 | Rosario | 382/103 |

OTHER PUBLICATIONS

Rajeev Ramanath, Wesley E. Snyder, Griff L. Bilbro, William A. Sander III; Demosaicking methods for Bayer color arrays; journal; Jul. 2002; pp. 306-315; Journal of Electronic Imaging 11(3); USA.
Search Report from EP Application No. 13182230.6 dated Dec. 20, 2013.
Altunbasak Y et al: "Demosaicking" color filter array interpolation [exploring the imaging process and the correlations among three color planes in single-chip digital cameras] IEEE Signal Processing Magazine, IEEE Service Center, Piscataway, NJ, USA, vol. 22, No. 1, Jan. 1, 2005.

* cited by examiner

*Primary Examiner* — Tuan Ho
*Assistant Examiner* — Zhenzhen Wu
(74) *Attorney, Agent, or Firm* — McGarry Bair PC

(57) ABSTRACT

Method of controlling the resolution of a hyperspectral image from an image sensor comprising pixels and at least one filter that defines subpixels within each pixel includes defining a window on the image sensor with an array of rows and columns of subpixels; weighting the subpixels within the window based upon one or more predefined parameters of the hyperspectral image to establish a value for a weighted average for the array for the predefined parameters; shifting the window by a predefined number of rows or columns; repeating the weighting and shifting steps for all possible windows on the image sensor; and processing the hyperspectral image based on the weighted averages.

7 Claims, 7 Drawing Sheets

METHOD OF CONTROLLING THE RESOLUTION OF A HYPERSPECTRAL IMAGE

BACKGROUND OF THE INVENTION

Both conventional and hyperspectral imaging systems collect and record electromagnetic energy in multiple distinct spectral bands. The resulting imagery is displayed by combining the spectral band information into one or many channels to form a grayscale or color representation of the image. Hyperspectral imagery (HSI) devices are a class of spectrometers that record energy in many discrete spectral bands or colors simultaneously at a multitude of spatial picture elements, called pixels on an image sensor. Standard broadband imagers record one value at each pixel for all the detected incident energy across a wide spectrum, and create an image in two spatial dimensions from a two-dimensional array of detectors. HSI devices differ from standard broadband imagers by creating an image with an additional spectral dimension. Each HSI pixel may have ten to hundreds of wavelength values recorded.

BRIEF DESCRIPTION OF THE INVENTION

One aspect of the invention relates to a method of controlling the resolution of a hyperspectral image from an image sensor having pixels and at least one filter that defines subpixels within each pixel. The method includes defining a window on the image sensor with an array of rows and columns of subpixels; weighting the subpixels within the window based upon one or more predefined parameters of the hyperspectral image to establish a value for a weighted average for the array for the predefined parameters; shifting the window by a predefined number of rows or columns wherein the predefined number is less than the number of respective rows or columns in the array; repeating the weighting and shifting steps for all possible windows on the image sensor; and processing the hyperspectral image based on the weighted averages.

DESCRIPTION OF EMBODIMENTS OF THE INVENTION

Figure 1:
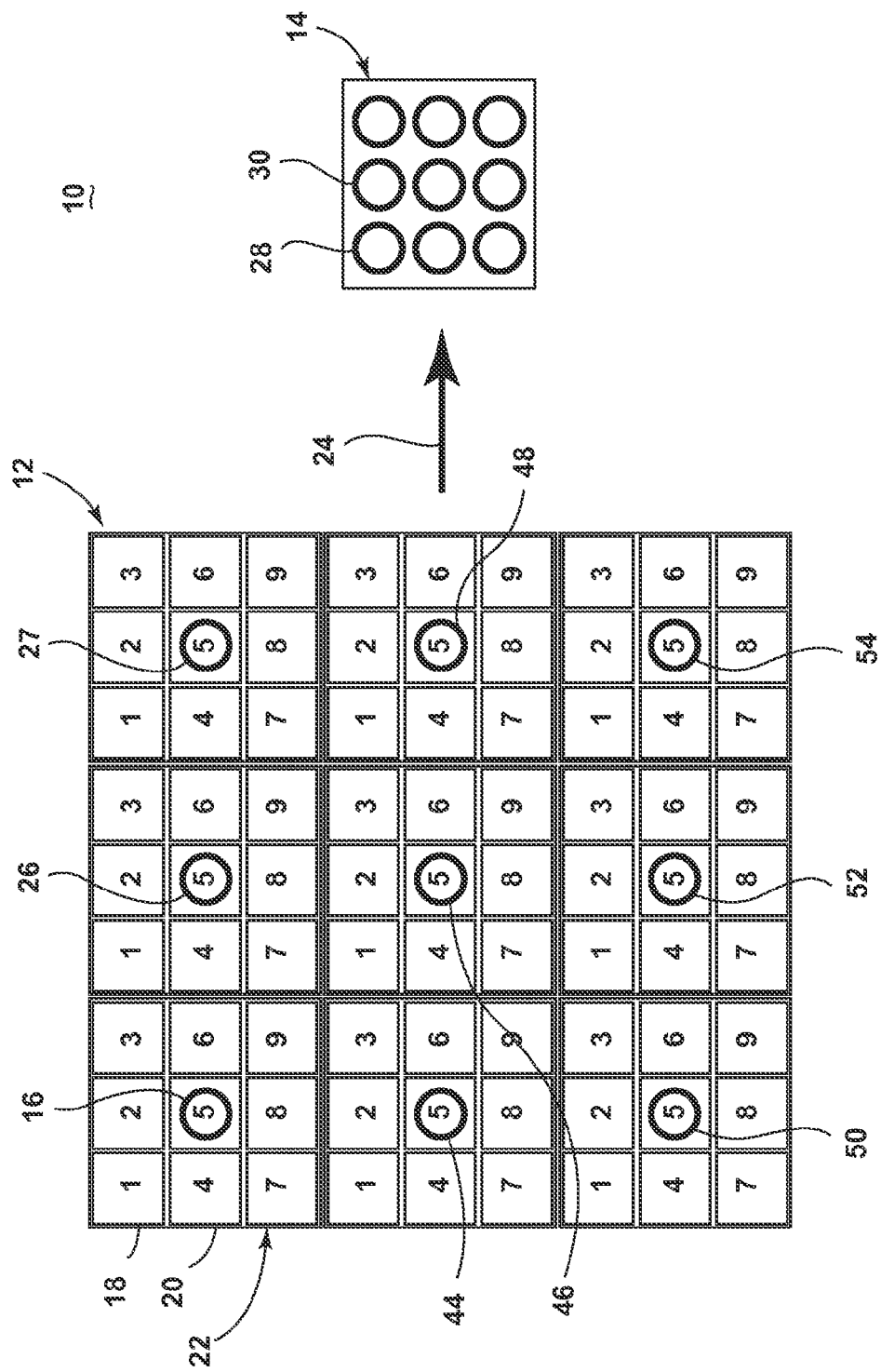
FIG. 1 is a representative illustration demonstrating a typical known sampling of a hyperspectral image from a hyperspectral data cube.

In the background and the following description, for the purposes of explanation, numerous specific details are set forth in order to provide a thorough understanding of the technology described herein. It will be evident to one skilled in the art, however, that the exemplary embodiments may be practiced without these specific details. In other instances, structures and device are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program code, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program code for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configuration, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Technical effects of the method disclosed in the embodiments include improving the spatial resolution of an image from existing information which has a direct correlation to improving a sensor's range, especially when object detection and tracking methods are used in conjunction with the sensor. As well, the method improves on existing spectral composite image techniques by more efficiently using the data being collected by the system. This technique can be used on any system that generates composite imagery from spectral cube arrays. Implementation of this technique on spectral cube array systems will improve the spatial resolution of the sensor by a factor equal to the spectral cube dimension.

FIG. 1 is a representative illustration demonstrating the known sampling of a panchromatic representation of a hyperspectral image 14 from a hyperspectral data cube 12. A panchromatic representation of a hyperspectral image 14 formed from a hyperspectral data cube 12 is the broadband image formed by combining the data from all of the spectral bands collected from the pixels of an HSI device into a single array. A hyperspectral data cube 12 consists of the array of values from the pixels on the image sensor of an HSI device where each pixel such as 22 of the hyperspectral data cube 12 consists of an array of subpixels, numbering nine in this embodiment and identified as nos. 1-9 such as 16, 18, 20. Each subpixel such as 16, 18, 20 in the pixel 22 represents a specific spectral band and is contained within a single pixel 22. It will be understood that there may be greater or fewer subpixels in each pixel, depending on a specific application. The spectral bands represented by the subpixels may be the nine spectral bands of the hyperspectral data cube 12, or the 16 spectral bands of an HSI device such as the SOC710 from Surface Optics Corporation or the three distinct spectral bands corresponding to the colors of red, blue and green of the well-known Bayer filter although other spectral band filter configurations are possible depending upon the requirements of a specific implementation including configurations where the spectral bands represented by the subpixels are the same for multiple subpixels in a pixel.

The hyperspectral data cube 12 is converted into a panchromatic representation of a hyperspectral image 14 by a conversion method 24 that combines the values of all the subpixels, nos. 1-9 in this embodiment, of a given hyperspectral pixel 22 into a single panchromatic pixel 28 value. The nine subpixels in the pixel 22 in this embodiment each contain values representing intensity at a unique wavelength, numbered one through nine, and are combined through the conversion method 24. The conversion method 24 used to combine all of the subpixel values of each hyperspectral pixel 22 is repeated for all hyperspectral pixels in the hyperspectral data cube 12 where, in this embodiment, each pixel is centered at the subpixel corresponding to wavelength five (16, 26, 44, 46, 48, 50, 52, 54) and consists of the subpixels corresponding to wavelength five and the eight nearest subpixels.

One conversion method 24 used to form a single panchromatic pixel 28 value is to average the values of all nine of the subpixels of a hyperspectral pixel 22. By sampling the data in the hyperspectral data cube 12 using the prescribed conversion method 24, the hyperspectral image 14 will have the same resolution or number of pixels as the hyperspectral data cube 12. Each pixel of the hyperspectral data cube 12 centered on the subpixel corresponding to wavelength five (16, 26, 27, 44, 46, 48, 50, 52, 54) will be sampled to generate a single panchromatic pixel such as 28 and 30.

Figure 2:
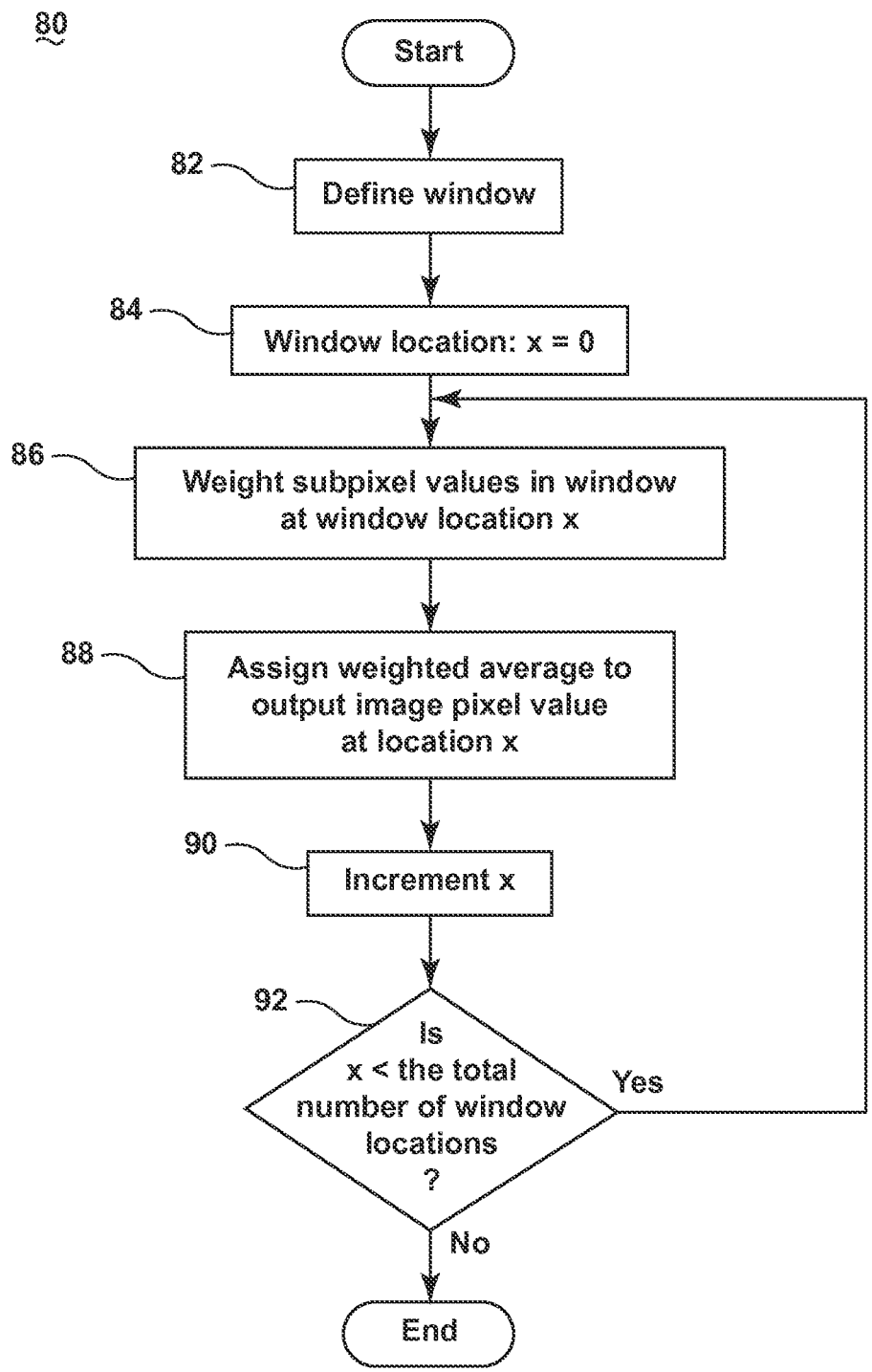
FIG. 2 is a flowchart demonstrating a method of upsampling a hyperspectral image derived from a hyperspectral data cube according to an embodiment of the invention.

FIG. 2 is a flowchart demonstrating an upsampling method 80 of controlling the resolution of a hyperspectral image derived from a hyperspectral data cube according to an embodiment of the invention. With the method 80, each panchromatic pixel of the hyperspectral image may be generated by a sampled subset of subpixels of a hyperspectral data cube without regard to the boundaries of a pixel of the hyperspectral data cube. The method 80 may consist of the steps of defining a window 82, weighting the subpixel values in the window 86 for a given window location, assigning a weighted average to an output hyperspectral image 88 and repeatedly weighting and shifting windowed subpixels by iterating through the set of window locations starting at a first window location 84 and incrementing through successive window locations 90 until all window locations have been processed 92.

The first step of the upsampling method 80 may be to define a window 82, also known in image processing as a mask or template, to determine which subpixels of a hyperspectral data cube may be used to calculate a value for a resulting pixel of a hyperspectral image. The window may be the same size as a pixel in terms of the number and location of included subpixels. However, any size window may be used depending upon the implementation. A window may include more or less subpixels than contained in a pixel and it may be an entirely different shape than the shape of the set of subpixels that define a pixel. For example, a window consisting of a rectangular arrangement of subpixels may be applied to a hyperspectral data cube consisting of pixels with a square arrangement of subpixels.

The window may be applied to a first window location 84, followed by weighting the subpixel values in the window 86. At each windowed location, a weighting may be applied to the value of each of the windowed subpixels. Mathematically, this may be represented as:

$$z = \sum_{p=1}^{P} w_p y_p$$

where z is a pixel value of the resulting hyperspectral image; y is the value of a subpixel of the hyperspectral data cube in the window; w is the weight to be applied to the subpixel and P is the total number of subpixels in the window. In its simplest form, an equal weighting may be applied that affects an averaging operation, i.e. all $w_p$ weights are set to the value of 1/P.

The weighting may be used to modify the relative contributions of each subpixel to the value of the resulting pixel where the set of weights may be based upon a predefined parameter. The predefined parameter may be selected to advantageously display features of the subject of the resulting image.

Other weights may be applied and although the set of all weights in a window may typically sum to 1, the invention is not limited to that constraint. A preferred set of weights are derived to compensate for the frequency response of solar radiation and the further attenuation of selective wavelengths due to absorption bands in Earth's atmosphere. The weighting scheme may be designed to advantageously display features of the subject of the resulting image.

The values of the weighted, windowed subpixels may be combined into a single weighted average of the subpixels. The weighted average may then be assigned a pixel in the resulting hyperspectral image 88 at a location corresponding to the current window location.

The process of weighting subpixel values in a window 86 and assigning the weighted average to an output pixel in a resulting hyperspectral image 88 may be repeated for all possible window locations until all locations have been processed 92. Serially, this process may be equivalent to shifting the window a predefined number of rows or columns. In a preferred embodiment of the invention, the window may be shifted by one subpixel in either the vertical or horizontal direction but other shifts may be used to control the resolution of the resulting hyperspectral image. The weighting process may then be repeated to form the next pixel in the hyperspectral image using the new windowed neighborhood of subpixels. In another embodiment of the invention, simultaneous windows may be instantiated such that they are the set of windows shifted by one subpixel in either the vertical or horizontal directions and all resulting output pixels of the hyperspectral image may generated simultaneously.

Figure 3:
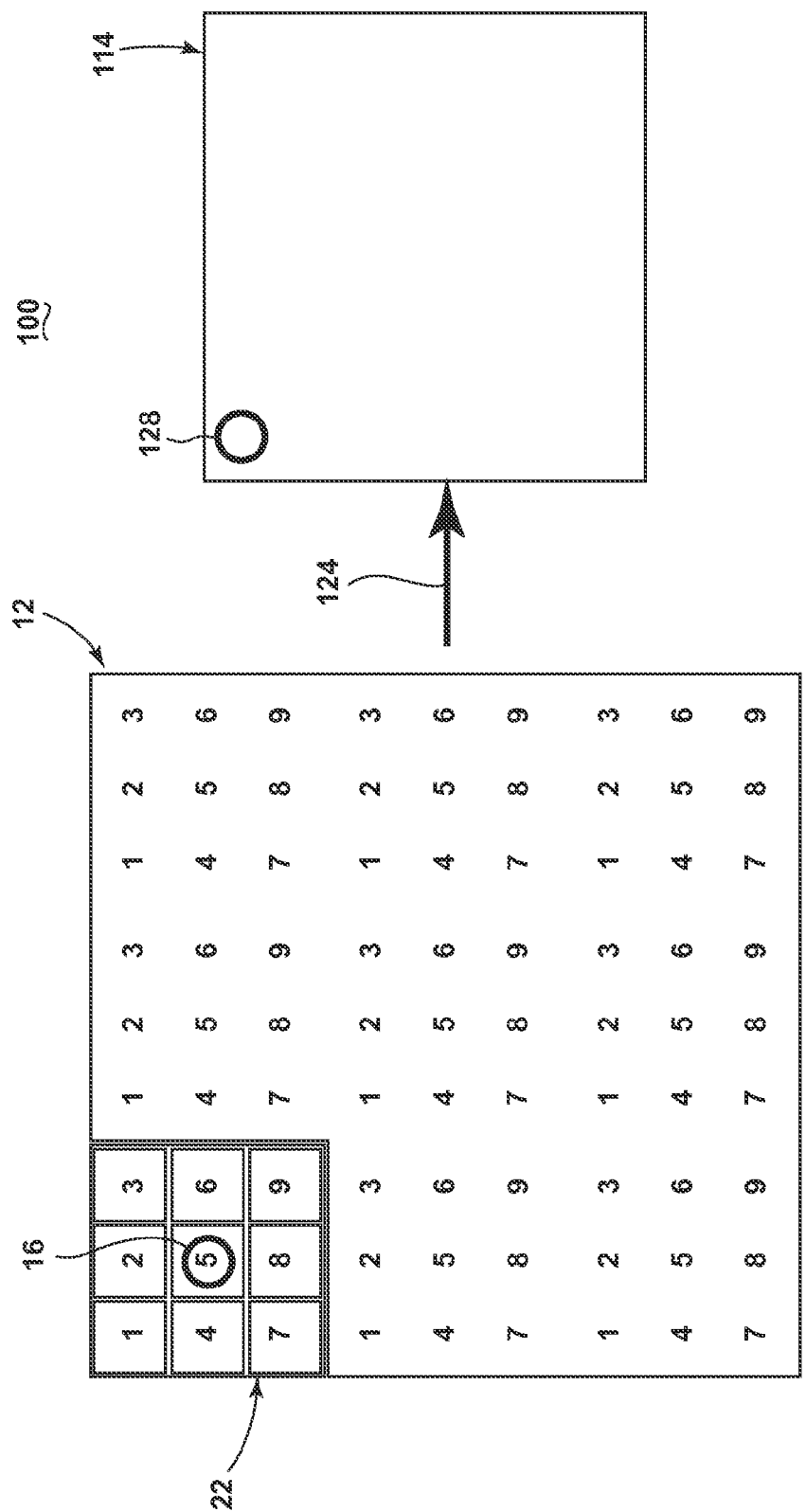
FIG. 3 is a representative illustration demonstrating the upsampling of a first pixel of a hyperspectral image derived from a hyperspectral data cube in the method of FIG. 2.

By way of example, FIG. 3 is a representative illustration demonstrating the upsampling 100 of a first pixel 128 of a hyperspectral image 114 derived from a hyperspectral data cube 12 according to the method of FIG. 2. The conversion method 124 demonstrating the upsampling 100 of a first pixel 128 of a hyperspectral image 114 derived from a hyperspectral data cube 12 may use a window 22 to determine which subpixels of a hyperspectral data cube 12 may be used to calculate a value for a resulting pixel 128 of the hyperspectral image 114.

Figure 4:
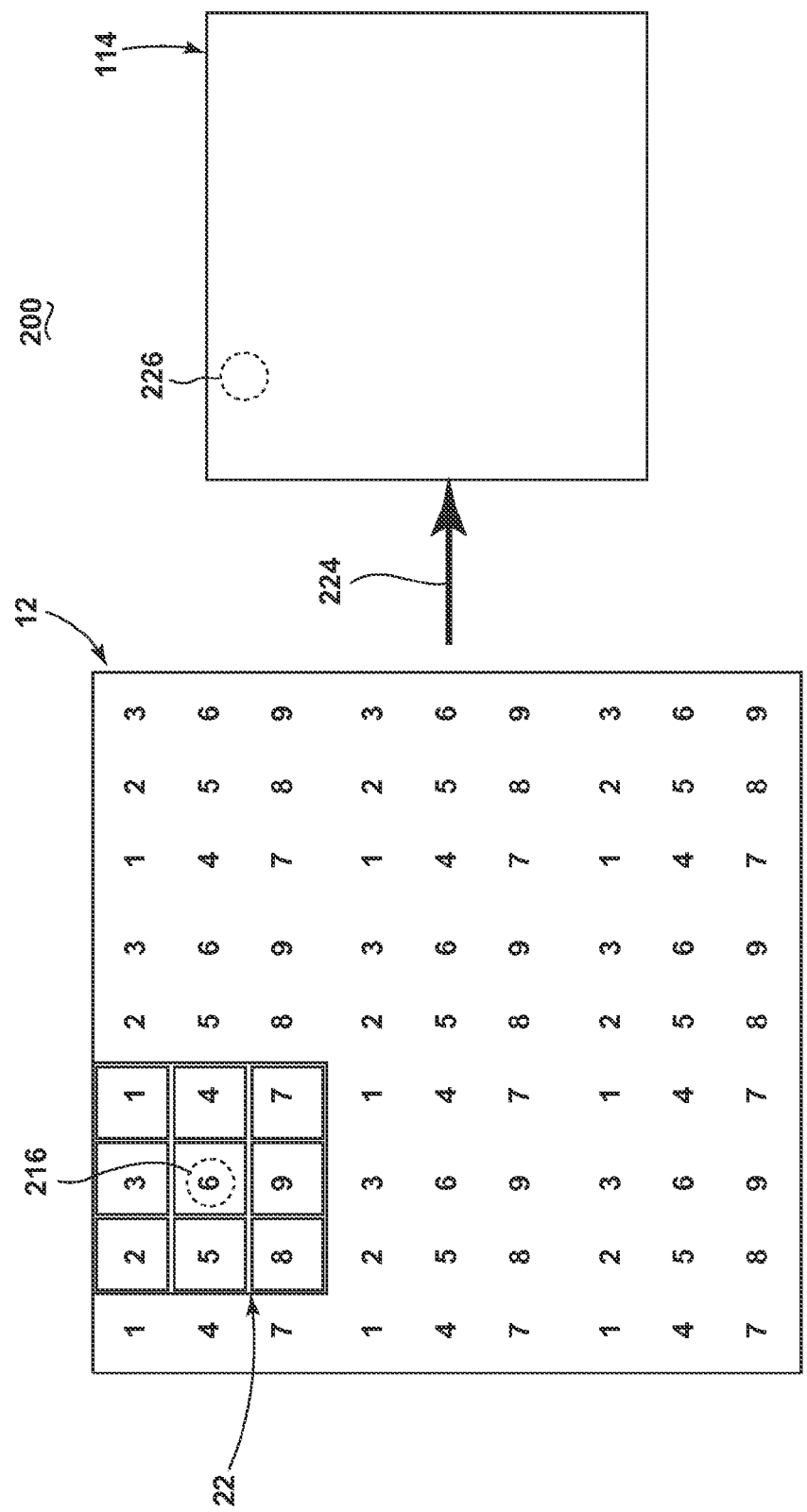
FIG. 4 is a representative illustration demonstrating the upsampling of a second pixel of a hyperspectral image derived from a hyperspectral data cube in the method of FIG. 2.
Figure 5:
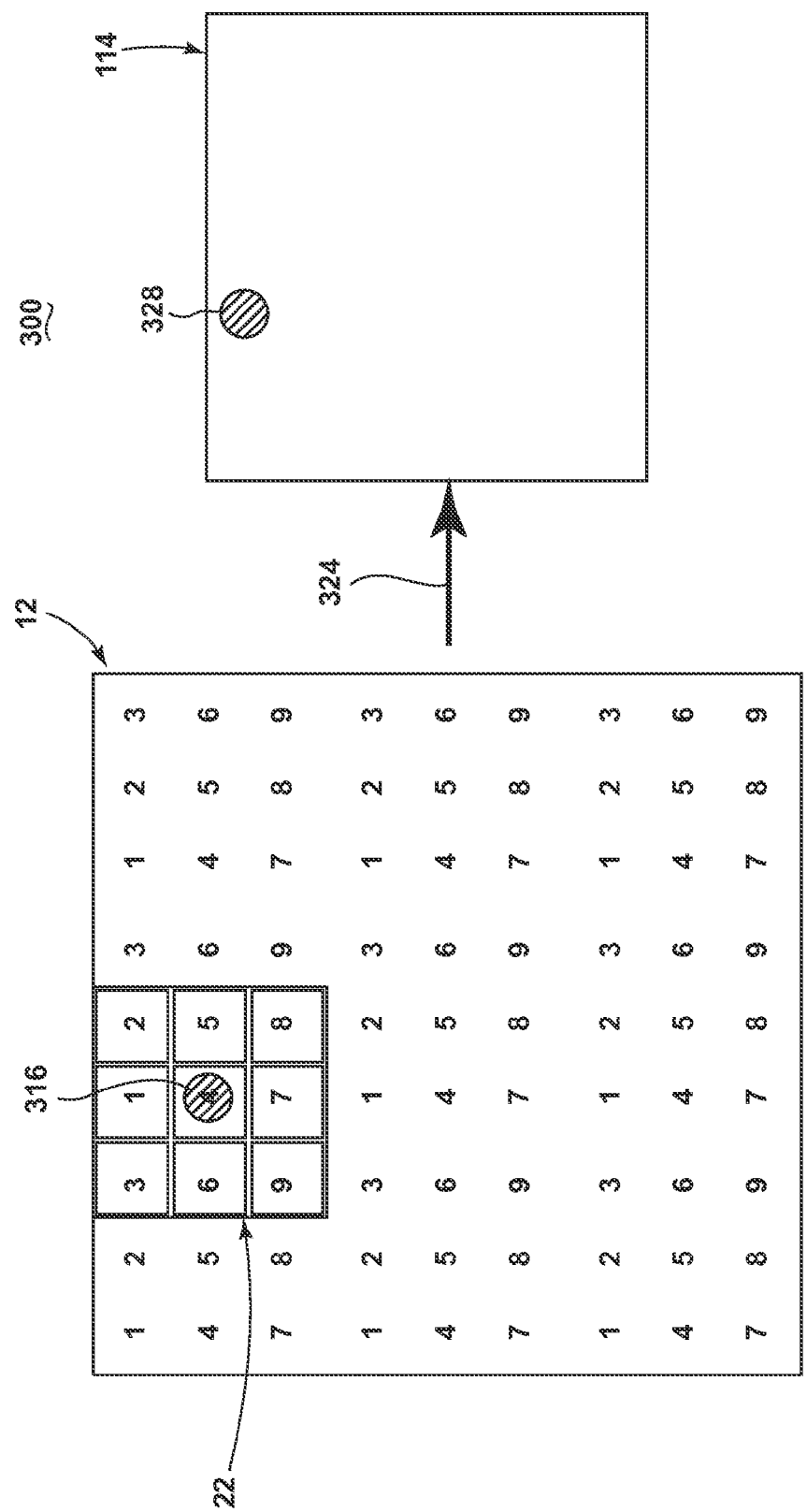
FIG. 5 is a representative illustration demonstrating the upsampling of a third pixel of a hyperspectral image derived from a hyperspectral data cube in the method of FIG. 2.
Figure 6:
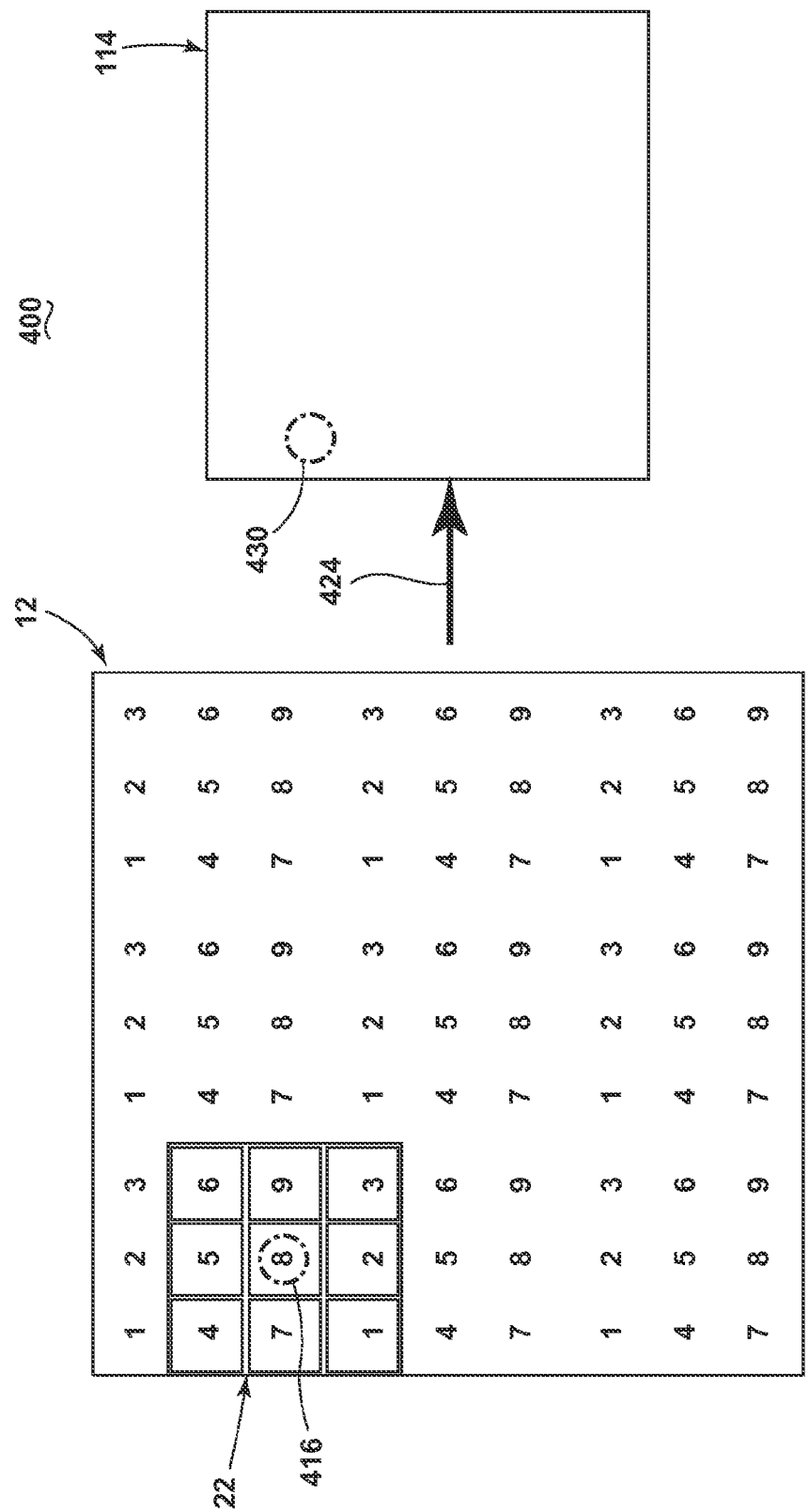
FIG. 6 is a representative illustration demonstrating the upsampling of a fourth pixel of a hyperspectral image derived from a hyperspectral data cube in the method of FIG. 2.

The window 22 may then be shifted by a predefined number of rows or columns. In one embodiment of the invention, the window may be shifted by one subpixel in either the vertical or horizontal direction but other shifts may be used to control the resolution of the resulting hyperspectral image 114. FIGS. 4-6 are representative illustrations demonstrating the upsampling of pixels 226, 328, 430 of the hyperspectral image 114 by use of repeated shifting of the window 22 with single subpixel shifts.

FIG. 4 is a representative illustration demonstrating the upsampling 200 of a second pixel 226 of a hyperspectral image 114 derived from a hyperspectral data cube 12 in accord with the embodiment of FIG. 3. The conversion method 224 demonstrating the upsampling 200 of a second pixel 226 of a hyperspectral image 114 derived from a hyperspectral data cube 12 may use a window 22 shifted one column right from the window location in FIG. 3 to determine which subpixels centered at subpixel 216 of a hyperspectral data cube 12 may be used to calculate a value for a resulting second pixel 226 of the hyperspectral image 114.

FIG. 5 is a representative illustration demonstrating the upsampling 300 of a third pixel 328 of a hyperspectral image 114 derived from a hyperspectral data cube 12 in accord with the embodiment of FIGS. 3 and 4. The conversion method 324 demonstrating the upsampling 300 of a third pixel 328 of a hyperspectral image 114 derived from a hyperspectral data cube 12 may use a window 22 shifted one column right from the window location in FIG. 4 to determine which subpixels of a hyperspectral data cube 12 may be used to calculate a value for a resulting third pixel 328 of the hyperspectral image 114.

FIG. 6 is a representative illustration demonstrating the upsampling 400 of a fourth pixel 430 of a hyperspectral image 114 derived from a hyperspectral data cube 12 in accord with the embodiment of FIGS. 3-5. The conversion method 424 demonstrating the upsampling 400 of a fourth pixel 430 of a hyperspectral image 114 derived from a hyperspectral data cube 12 may use a window 22 shifted one row down from the window location in FIG. 3 to determine which subpixels of a hyperspectral data cube 12 may be used by the conversion method 424 to calculate a value for a resulting fourth pixel 430 of the hyperspectral image 114.

Figure 7:
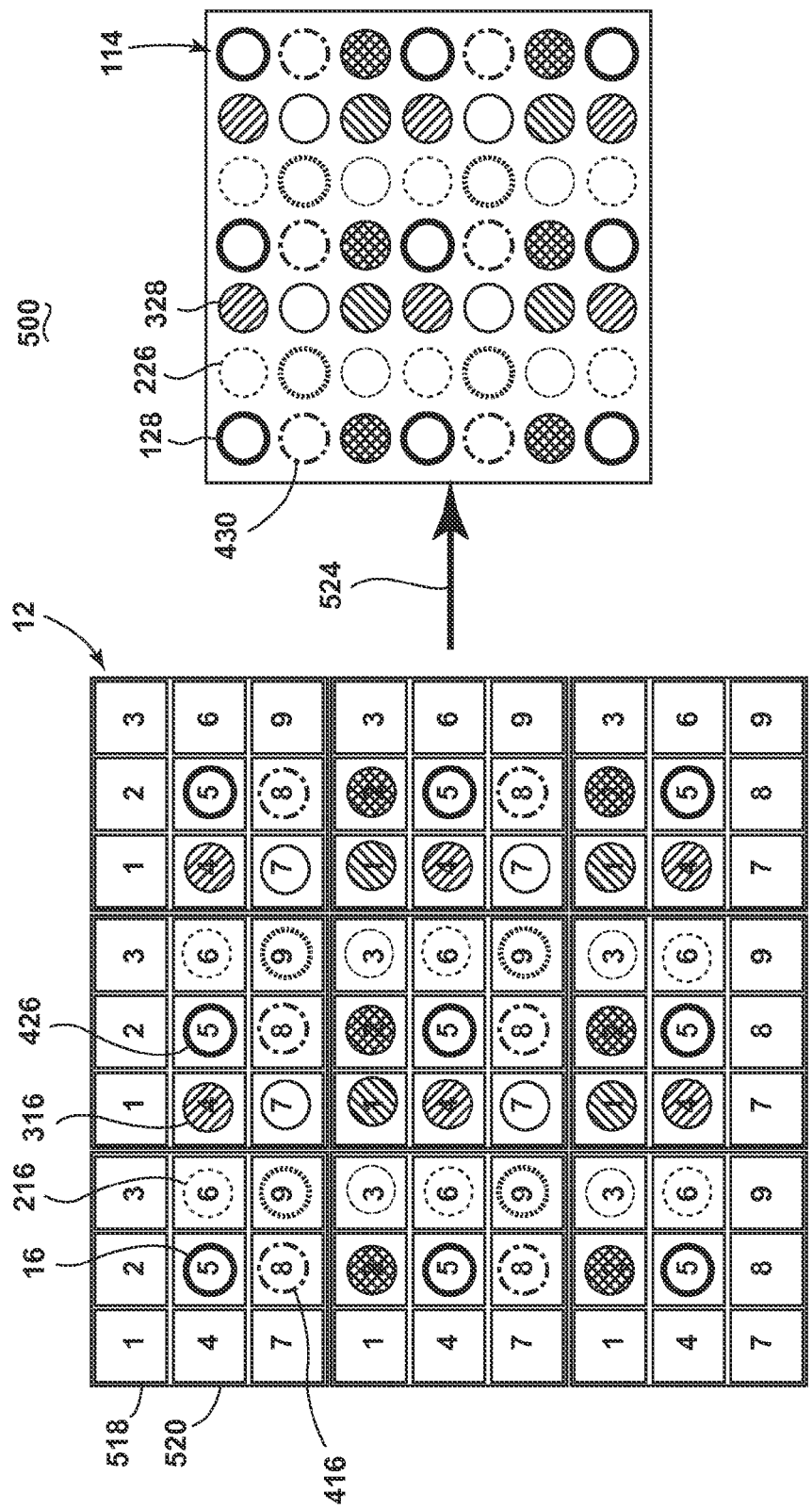
FIG. 7 is a representative illustration demonstrating a complete upsampling of a hyperspectral image derived from a hyperspectral data cube in the method of FIG. 2.

FIG. 7 is a representative illustration demonstrating a complete upsampling 500 of a hyperspectral image 114 derived from a hyperspectral data cube 12 according to the method of FIG. 2. The panchromatic representation of the hyperspectral image 114 may be formed by repeating the weighting and shifting steps for all possible arrays of the subpixels of the hyperspectral data cube 12. The conversion method 524 demonstrating the upsampling 500 to create a hyperspectral image 114 derived from a hyperspectral data cube 12 may repeatedly use a window that is shifted by one subpixel at a time to determine which subpixels of a hyperspectral data cube 12 may be used to calculate a value for each resulting pixel of the hyperspectral image 114, as shown in FIGS. 3-6. The resulting pixels 128, 226, 328, 430 from the weighted, windowed average shown in FIGS. 3-6 are shown as placed in the final hyperspectral image 114 relative to all of the weighted, windowed averages used to construct all of the pixels for the hyperspectral image 114.

A panchromatic representation of a hyperspectral image 114 formed from a hyperspectral data cube 12 using an embodiment of the resolution-controlling method of the present invention may establish a one-to-one mapping between the hyperspectral data cube subpixels and the hyperspectral image pixels with the possible exception of boundary hyperspectral data cube subpixels such as 518, 520. The boundary hyperspectral data cube subpixels 518, 520 may not have an analogue in the resulting hyperspectral image 114, establishing a final resolution for the hyperspectral image as M−2×N−2 pixels where M and N are the number of hyperspectral data cube subpixels in a row and column respectively, effectively improving the spatial resolution of the sensor by a factor equal to the spectral cube dimension.

Using a single weighting scheme may result in an image that is displayed as grayscale. Multiple different weighting schemes may be employed simultaneously to generate distinct channels of a resulting image. For example, the display of a panchromatic representation of a hyperspectral image 114 may have multiple color channels. The resulting channels, typically expressed as RGB, may represent the actual visible color that the subject of the image actually appears or a false color image whereby the weighted panchromatic representation of the hyperspectral image is imbued with visible color characteristics that may not represent the actual color characteristics of the subject of the image but are nonetheless visually appealing to a viewer.

An important distinction between the method of the present invention and the well-known techniques of demosaicing is that the techniques commonly used in demosaicing interpolate surrounding pixels to estimate the red, green and blue subpixel values that are inherently missing in each subpixel. The method of the current invention does not attempt to interpolate for missing pixel values by analysis of surrounding subpixels but instead changes the center of the RGB pixel that is used for display. By iterating over each of the color channels, the method may perform an interpolation of the RGB pixel value by continually redefining the color filter array pattern definition of a Bayer filter without trying to interpolate the missing pixel values.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling the resolution of a hyperspectral image from an image sensor comprising pixels and at least one filter that defines subpixels within each pixel, the method comprising:

defining a window on the image sensor comprising an array of rows and columns of subpixels, weighting the subpixels within the window based upon at least one predefined parameter of the hyperspectral image to establish a value for a weighted average for the array for the at least one predefined parameter, shifting the window by a predefined number of rows or columns wherein the predefined number is less than the number of respective rows or columns of subpixels in a pixel, repeating the weighting and shifting steps for all possible arrays on the image sensor, and processing the hyperspectral image based on the weighted averages.

2. The method of claim 1 wherein the at least one predefined parameter is an intensity value of at least one of red, green and blue spectral bands.

3. The method of claim 2 wherein the at least one predefined parameter is an intensity value of all of red, green and blue spectral bands.

4. The method of claim 1 wherein the at least one filter is a Bayer filter.

5. The method of claim 1 wherein the at least one predefined parameter is an intensity value of contiguous spectral bands.

6. The method of claim 5 wherein the intensity value is determined from 16 spectral bands.

7. The method of claim 1 where the at least one filter is a hyperspectral filter comprising a lenslet of a microlens array.

* * * * *

UNITED STATES PATENT AND TRADEMARK OFFICE
CERTIFICATE OF CORRECTION

Page 1 of 1

PATENT NO. : 8,797,431 B2
APPLICATION NO. : 13/598029
DATED : August 5, 2014
INVENTOR(S) : Buehler et al.

It is certified that error appears in the above-identified patent and that said Letters Patent is hereby corrected as shown below:

In the Claims

In Column 8, Line 34, in Claim 7, delete "where" and insert -- wherein --, therefor.

In Column 8, Line 34, in Claim 7, delete "a lenslet" and insert -- of lenslets --, therefor.

Signed and Sealed this
Eighteenth Day of August, 2015

Michelle K. Lee
*Director of the United States Patent and Trademark Office*

UNITED STATES PATENT AND TRADEMARK OFFICE
CERTIFICATE OF CORRECTION

PATENT NO. : 8,797,431 B2  
APPLICATION NO. : 13/598029  
DATED : August 5, 2014  
INVENTOR(S) : Eric Daniel Buehler et al.

Page 1 of 1

It is certified that error appears in the above-identified patent and that said Letters Patent is hereby corrected as shown below:

Title Page, item (73) Assignee: "General Electric Company, Schenectady, NY (US)" should be -- GE Aviation Systems LLC, Grand Rapids, MI (US) --

Signed and Sealed this  
First Day of September, 2015

Michelle K. Lee  
*Director of the United States Patent and Trademark Office*